US00RE36553E

United States Patent [19]

Karasek et al.

[11] E Patent Number: Re. 36,553

[45] Reissued Date of Patent: Feb. 8, 2000

[54] INCINERATION OF WASTE MATERIALS

[75] Inventors: Francis W. Karasek, Waterloo; Leslie C. Dickson, Saskatoon, both of Canada; Otto Hutzinger, Bayreuth, Germany

[73] Assignee: University of Waterloo, Waterloo, Canada

[21] Appl. No.: 08/585,768

[22] Filed: Jan. 16, 1996

Related U.S. Patent Documents

Reissue of:

[64] Patent No.: 4,793,270
Issued: Dec. 27, 1988
Appl. No.: 06/946,035
Filed: Dec. 24, 1986

[51] Int. Cl.[7] ..... F23B 7/00

[52] U.S. Cl. ..... 110/344; 110/345; 110/346

[58] Field of Search ..... 110/344, 345, 110/346, 216; 432/72

[56] References Cited

U.S. PATENT DOCUMENTS

| | | | |
|---|---|---|---|
| 4,388,877 | 6/1983 | Molayem et al. | 110/345 |
| 4,495,163 | 1/1985 | Nguyen | 110/346 |
| 4,503,785 | 3/1985 | Socca | 110/345 |
| 4,525,142 | 6/1985 | Gleason et al. | 110/345 |
| 4,579,069 | 4/1986 | Gay et al. | 110/346 |
| 4,624,192 | 11/1986 | Mansfield | 110/344 |
| 4,642,225 | 2/1987 | Leikert | 110/345 |
| 4,655,148 | 4/1987 | Winship | 110/345 |
| 4,665,841 | 5/1987 | Kish | 110/345 |

*Primary Examiner*—Henry A. Bennett
*Assistant Examiner*—Pamela A. Wilson
*Attorney, Agent, or Firm*—Sim & McBurney

[57] ABSTRACT

In the conventional incineration of solid waste materials, flyash present in the combustion products gas stream catalyzes the formation of toxic dioxins from chlorinated organic materials. By providing a catalyst poison, such as carbon disulphide, in association with the flyash, typically by spraying onto the solid wastes prior to incineration, the catalytic effect is decreased, resulting in decreased dioxin formation.

15 Claims, 6 Drawing Sheets

DIOXINS

INCINERATION OF WASTE MATERIALS

Matter enclosed in heavy brackets [ ] appears in the original patent but forms no part of this reissue specification; matter printed in italics indicates the additions made by reissue.

FIELD OF INVENTION

The present invention relates to the incineration of waste materials and the prevention of the formation of dioxins and related compounds during such incineration.

BACKGROUND TO THE INVENTION

Incineration, an attractive alternative to burying for the disposal of urban garbage, is practiced throughout the world and results in a considerable decrease in waste volume and the recovery of energy in the form of steam or electricity. One of the significant drawbacks to the incineration procedure is that several hundred stable and toxic compounds, including polychlorinated dibenzodioxins (collectively commonly termed "dioxins") and polychlorinated bidenzofurans, are formed and are present in parts-per-million concentrations both in the flyash formed during combustion and in the stack emissions.

A large city may incinerate 3 to 5 million tons of garbage annually. For every million tons of urban waste incinerated, about 34,000 tons of flyash are produced by the typical incinerator. Between 95 and 99% of the flyash is precipitated electrostatically and buried in landfills. The remainder is emitted from the incinerator stack along with the gaseous by-products, namely water vapor, HCl, $CO_2$, air and volatilized organic compounds. The gaseous stack emissions introduce dioxins to the atmosphere and landfill disposal of flyash introduces dioxins into the earth, from where they my be leached into water systems.

The primary hazard of dioxins to humans may be cancer in the long term, but dioxins exert a much larger impact on the general environment and are considered undesirable. There exists, therefore, a need for a means to decrease the dioxin content of both solid and gaseous by-products from incinerator systems.

SUMMARY OF INVENTION

The inventors have made a fundamental discovery with respect to dioxin formation in municipal incinerators and, having made that discovery, provide a solution to the problem of dioxin formation. In particular, it has surprisingly been found that the flyash which is formed during incineration of solid municipal waste catalyzes the formation of dioxins from chlorinated phenols, combustion products of plastics, paper and chemicals, and other dioxin precursors in the gaseous combustion products. Some of the dioxins so formed are present and remain adsorbed on the surface of the flyash in the electrostatic precipitation and some pass with the gas stream out of the vent stack.

The effect of the flyash is both surprising and unexpected and, to the inventors' knowledge, is unique to flyash. Other high surface area solids, such as powdered firebrick, do not exhibit any catalytic effect. In order to minimize the catalytic effect of the flyash, in accordance with the present invention a material acting as a catalyst poison is provided in association with the flyash, so as to inhibit the catalytic activity of the flyash towards dioxin formation.

GENERAL DESCRIPTION OF INVENTION

Figure 1:
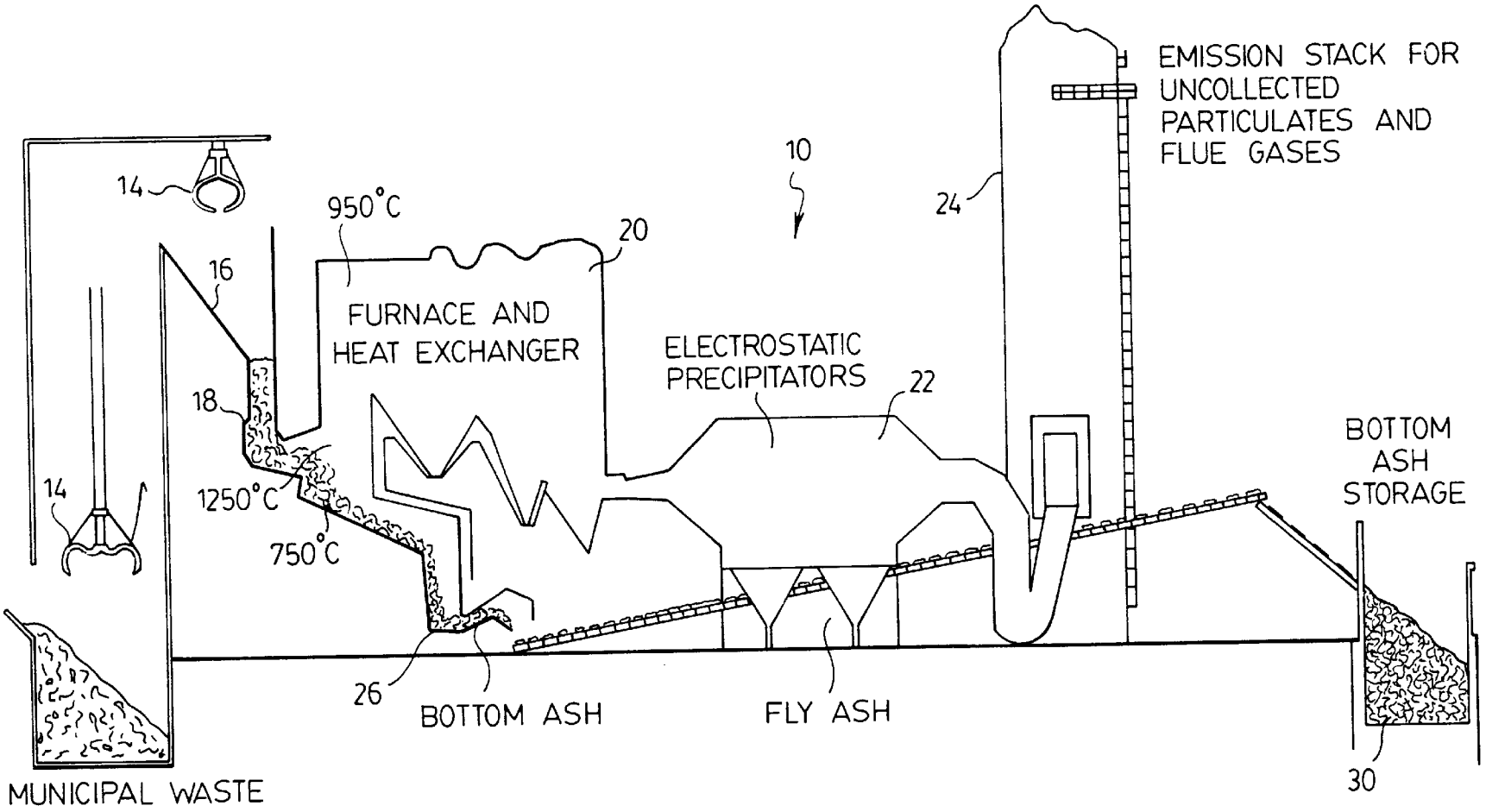
FIG.1. (PRIOR ART)
FIG. 1 is a schematic representation of a typical municipal solid waste incinerator.

Referring to FIG. 1, there is shown therein a typical municipal solid waste incinerator 10. Municipal refuse from storage tank 12 is fed, typically by grappling hooks 14, into a hopper 16. The waste material 18 is fed by gravity through a furnace zone 20 where the waste material is combusted in combustion air. The gaseous products of combustion pass through a heat exchanger 20 to recover heat from the gas stream, thence through electrostatic precipitators 22 to remove flyash therefrom, before passing to the emission stack 24 for venting to atmosphere.

The solid by-products of the combustion are removed as bottom ash from the end 26 of the incinerator and are conveyed by conveyor 28 to a bottom ash storage tank 30.

The electrostatic precipitators 22 remove most of the flyash and further particulates are removed in the emission stack 24. This flyash catalyzes the formation of dioxins. The mechanism appears to involve adsorption of precursors onto the flyash, catalytic reaction to form dioxin, followed by desorption of part of the dioxins into the flue gas stream. In accordance with the present invention, this cycle is broken by poisoning the catalytic effect of the flyash by a suitable catalyst poison.

The catalyst poison material may be provided in association with the flyash in any convenient manner, depending on the nature of the substance employed. One convenient procedure is to include the material or a precursor therefor in the solid refuse incinerated, such as by spraying the material onto the refuse before or during burning, mixing the material into the refuse before burning or by introducing the material into the combustion air, depending on the material employed. Another possibility is to incorporate the poison directly into the material to be incinerated in its manufacturing process. For example, in the case of newsprint, the paper may be impregnated with calcium sulphide.

We have found in our experimental studies that the temperature at which the precursors contact the flyash affects dioxin formation. In the combustion zone itself, where temperatures of 850° C. are typical, very little dioxin is detected in the combustion gases. Temperatures of about 400° C. or less generally are required for formation of the dioxins on flyash, so that the catalyst poison may be added after the combustion zone and ahead of the lower temperature portions of the incineration which favour dioxin formation, generally at a location where the combustion product stream has a temperature of about 400° to about 500° C., usually before the electrostatic precipitator.

The specific point of introduction of the catalyst poison material depends on its physical nature, i.e. whether a solid, liquid or gas, of the substance used.

Catalyst poisons are those substances that strongly adsorb and react with the active sites on the surface of catalysts to form stable, inactive surface compounds, thereby decreasing or eliminating the catalytic activity. A number of classes of compounds exist that function as catalyst poisons.

Acidic catalysts are poisoned by basic nitrogen-containing compounds and alkali metal ions. Typical nitrogen compounds are pyridines, carbazoles, indols, pyrolles and quinolines. Metallic catalysts are poisoned by sulfides, aresenic and lead compounds, carbon monoxide, chlorides and water. Nickel catalysts are poisoned by sulfur. A complex, common substance that can provide a variety of these poisons is high sulfur coal or pitch tar from petroleum operations.

Any substance which acts as a catalyst poison for flyash catalyzed dioxin formation may be employed in this invention. Sulphur compounds have been found to be effective catalyst poisons for flyash.

One effective catalyst poison material which may be employed herein is carbon disulphide. This compound may be introduced via the combustion air stream in vapor form, may be sprayed in liquid form onto the solids prior to the combustion zone, or preferably is sprayed in liquid form onto the refuse in the combustion zone to prevent prevaporization of the carbon disulfide. At the temperature of the combustion and post-combustion zones, usually about 300° to about 900° C., the carbon disulphide is volatized into the products gas stream and thereby becomes associated with the particulates (i.e. flyash) in that stream.

Another effective catalyst poison material which may be employed herein is sulfur dioxide. This compound is conveniently introduced with the combustion air stream and is present in the combustion products gas stream to poison the particulates.

Other suitable catalyst poisons which may be employed in this invention include high sulfur coal, pitch tar, and calcium sulphide.

Catalyst poisons traditionally are effective in small quantities, so that only minor amounts need be added to the combustion zone. Depending on the identity of the catalyst poison, the quantity of catalyst poison used may vary from about 0.01 to about 0.1 wt. %.

By providing a catalyst poison in association with the flyash, the quantity of various dioxins and related furans present in the tail gas stream and on the precipitated flyash is significantly decreased.

Dioxins are a family of chlorinated products having the general formula:

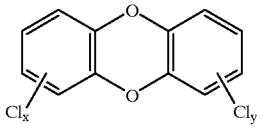

while the related furans have the general formula:

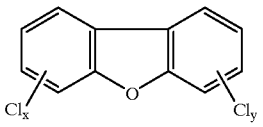

The dioxins and the furans exhibit varying degrees of toxicity, depending on the number of chlorine atoms present, with those compounds having greater numbers of chlorine atoms being more benign than those with lesser numbers of chlorine atoms.

Dioxin formation is thought to involve thermal reaction during the incineration step of pentachlorophenol formed as a combustion product from various organic materials in the solid waste material to form the octachlorodioxin, as follows:

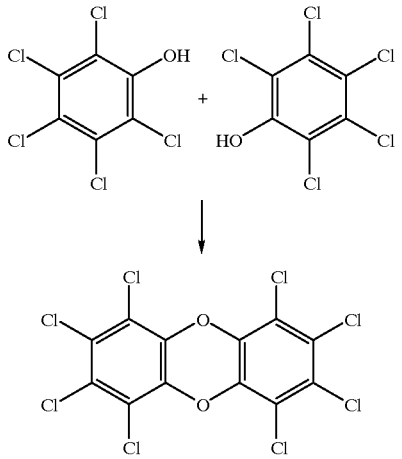

The octachlorodioxin then normally is catalytically converted to dioxins having lesser numbers of chlorine atoms on the benzene rings by the action of the flyash.

Other precursors of dioxins and furans have been identified by our experiments, including products of combustion of chlorinated polymeric materials, such as polyvinyl chloride, and inked newsprint.

By using the present invention, such catalytic effects are decreased, preferably minimized, hence decreasing the formation of the more toxic lesser chlorinated dioxins and furans, and resulting in a decreased concentration of such materials on the flyash and in the vent gas stream from the incinerator. In addition, by preventing formation of the lesser chlorinated species, the overall amount of dioxins entering the flue gases is decreased by virtue of the lower vapor pressure of the octachlorodioxin.

EXAMPLES

Example I

This Example shows that flyash promotes the production of chlorinated dioxins under simulated incinerator conditions.

An experimental test apparatus was set up comprising a glass flow tube passing through an oven. Part of the flow tube was a reservoir containing flyash from a refractory-wall mass-burning municipal refuse incinerator in Ontario, Canada. The Ontario flyash was exhaustively extracted with solvent and heated above 300° C. to remove all organic compounds.

Just upstream of the flyash was a bed of glass beads, onto which was deposited $^{13}C$-labelled pentachlorophenol. Pentachlorophenol is widely suspected of being capable of forming dioxin under the conditions found in incinerators. By using a stable-isotope labelled precursor enables the reaction products to be related directly to the pentachlorophenol reactant and permits them to be measured specifically.

Nitrogen gas at about 300° C. was passed through the flow tube, causing the compounds to vaporize and to pass through the flyash. Any reaction products which result were collected in a cooled impinger outside the oven. Both the flyash and the impinger contents were analyzed for dioxins using a gas chromatograph/mass spectrometer/computer data system.

The experiment was repeated for Machida flyash from a modern fluidized-bed municipal refuse incinerator in Japan, and ground firebrick in the reservoir and with an empty reservoir.

Figure 2:
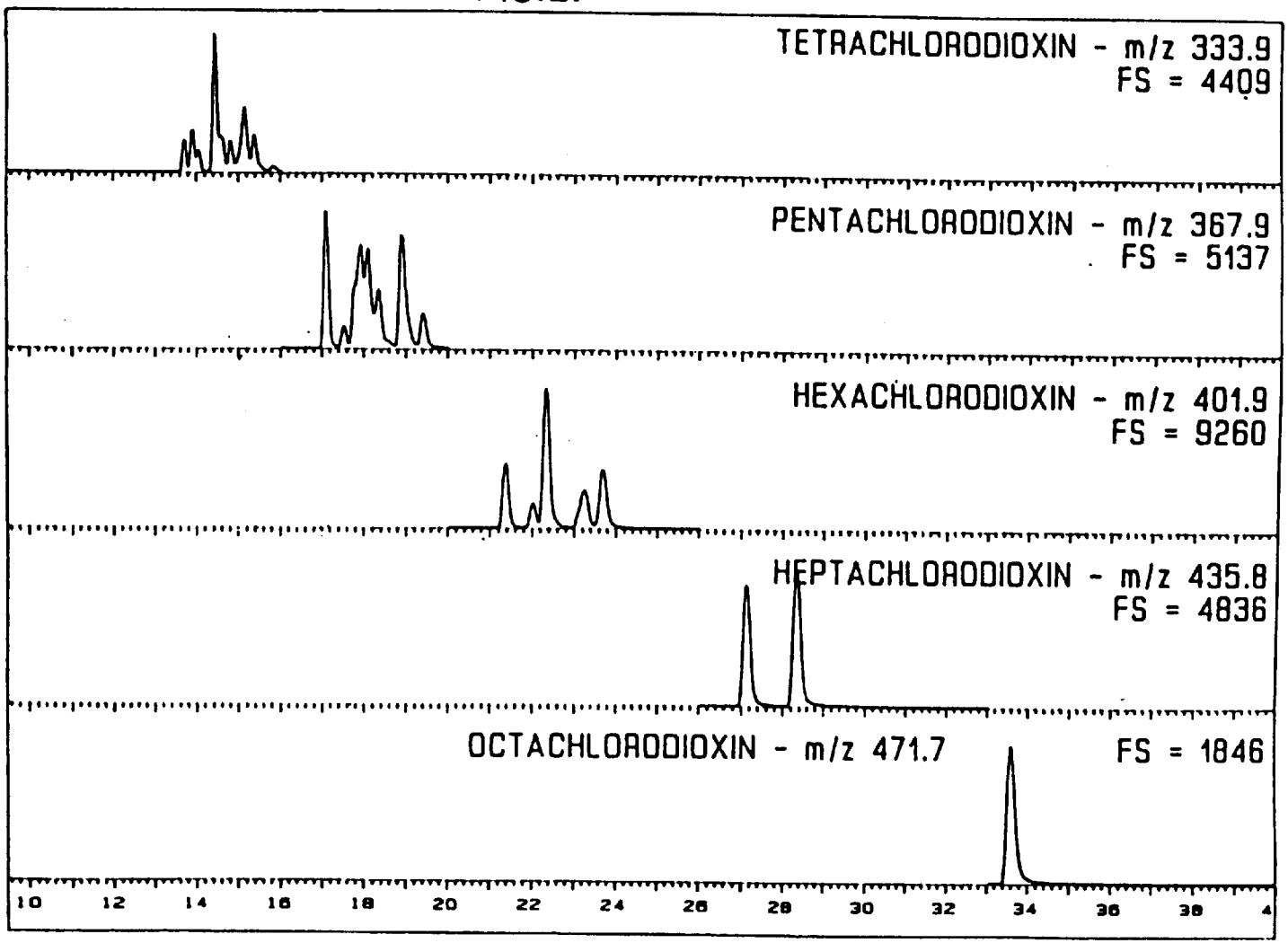
FIGS. 2 to 6 are graphical representations of the results of experiments conducted to demonstrate the catalytic effect of flyash in dioxin formation and the suppression of that effect by the use of certain sulfur-containing compounds.
Figure 3:
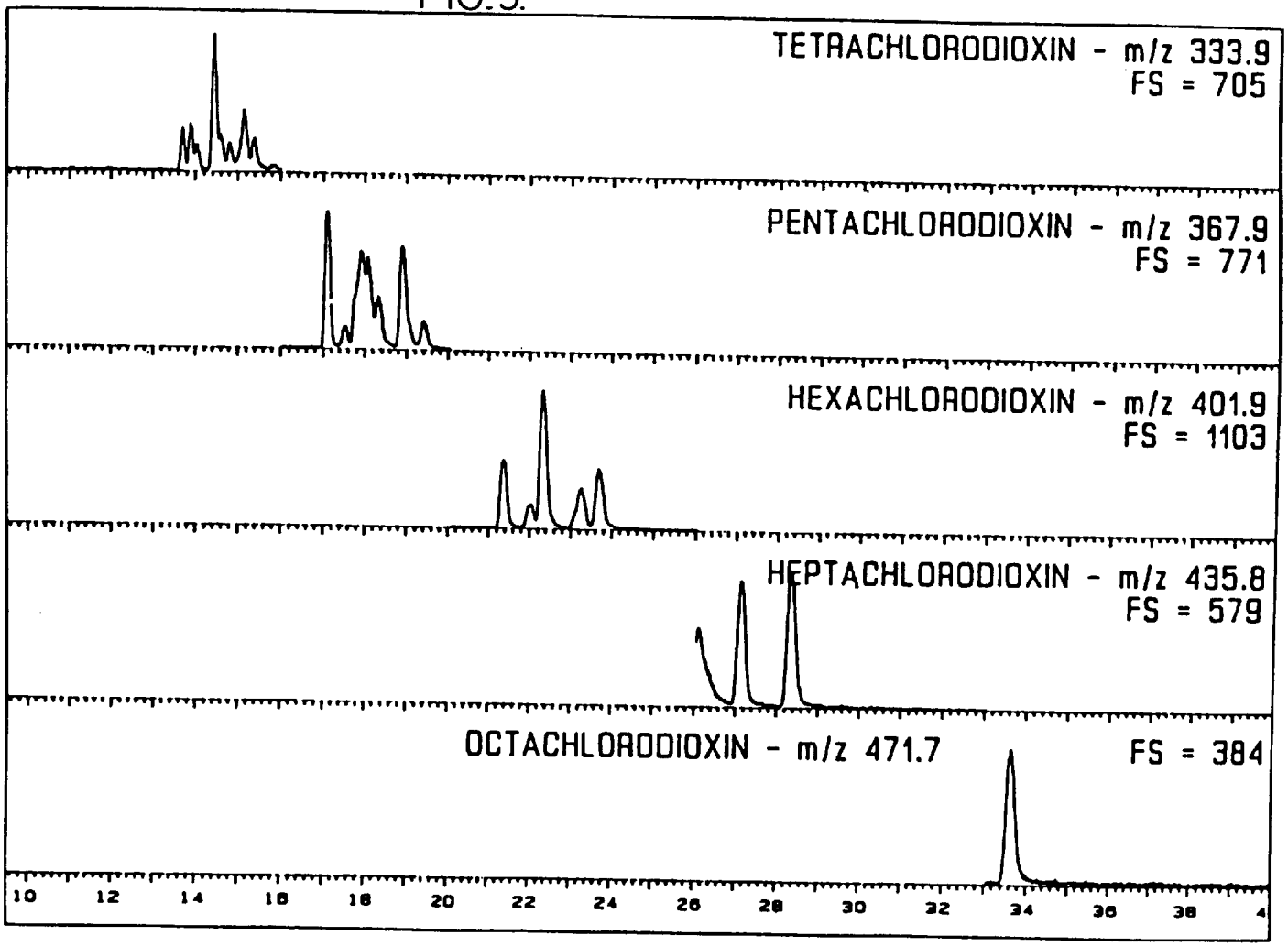
Figure 4:
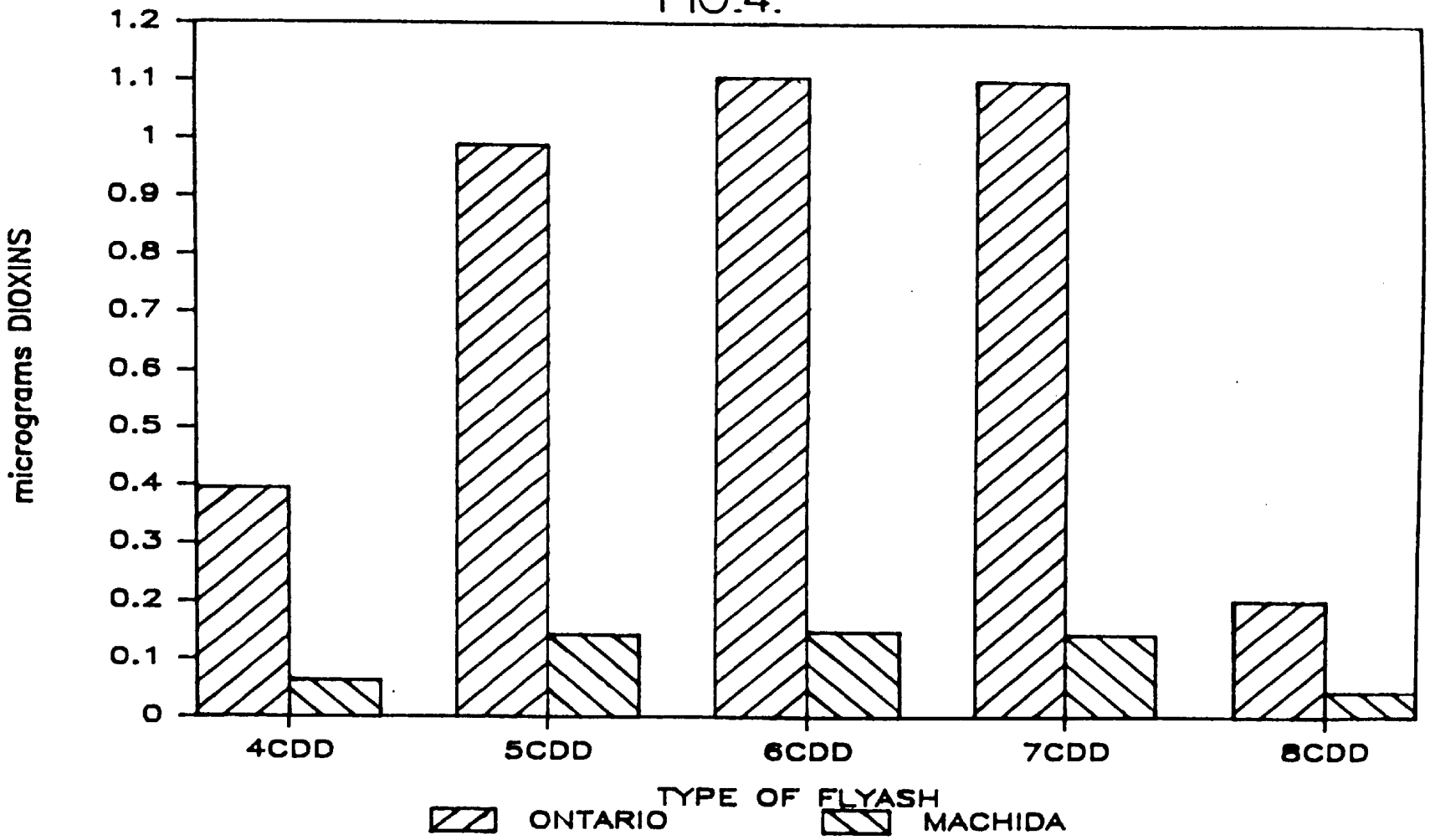

FIGS. 2 and 3 show the plots for the various dioxins produced using the Ontario and Machida flyashes respectively. FIG. 4 is a bar chart comparing the amounts of the dioxins produced by the two flyashes. From this FIG. 4, it will be seen that both flyashes produce the same isomer pattern and differ only in the amounts of dioxins produced.

Figure 5:
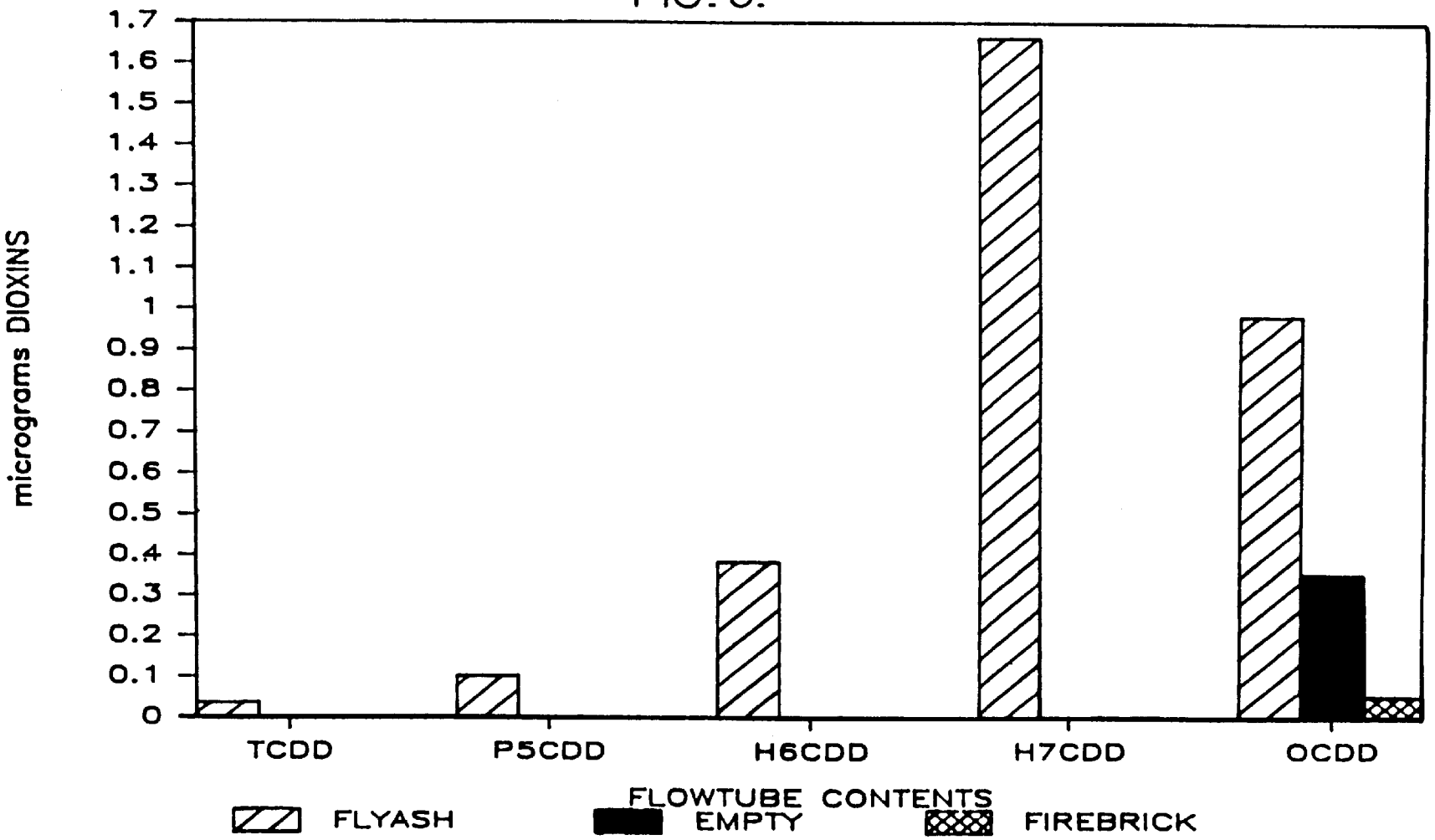

FIG. 5 is a bar chart comparing the amounts of dioxins produced from Ontario flyash, the empty reservoir and the ground firebrick. As can be seen, the empty reservoir and the firebrick had little or no effect. The flyash and the firebrick had very similar specific surface areas but produced very different effects with respect to dioxin formation.

The majority of the dioxins formed in the case of the empty tube and the firebrick were octachlorodioxin, the least toxic isomer of the chlorinated dioxins while, in the case of flyash, the much more toxic mixture of tetrachloro to octachlorodioxins was formed.

The data presented in FIGS. 2 to 5 indicates that the flyash surface has constituents and properties that promote the production of chlorinated dioxins from pentachlorophenol and that the effect is not solely due to the presence of a large surface area, since the firebrick experiment produced only a single dioxin compound. The flyash effect is not unique to one flyash but is the same in nature for two flyashes from widely-differing sources.

Example II

This Example illustrates that the catalytic production of dioxins from pentachlorophenol can be poisoned.

Based upon the data presented in Example I and similar results from other experiments, it is considered that flyash is exerting a catalytic effect on the products of incineration, by adsorption of precursors, catalytic reaction to form dioxins and desorption of dioxins into the gas stream.

Poisoning of the flyash, therefore, should prevent the catalytic effect and inhibit the formation of some or all of the chlorinated dioxins. Separate tests were run in which (a) 100 uL of thiophene and (b) seven mL of carbon disulphide were added to the flyash prior to passage of the pentachlorophenol-containing nitrogen stream through the tube. Tests were carried out on the treated flyash and compared to the results already generated for untreated flyash. In addition, the flyash to which the carbon disulphide was added was tested to see if the catalytic activity remained inhibited.

Figure 6:
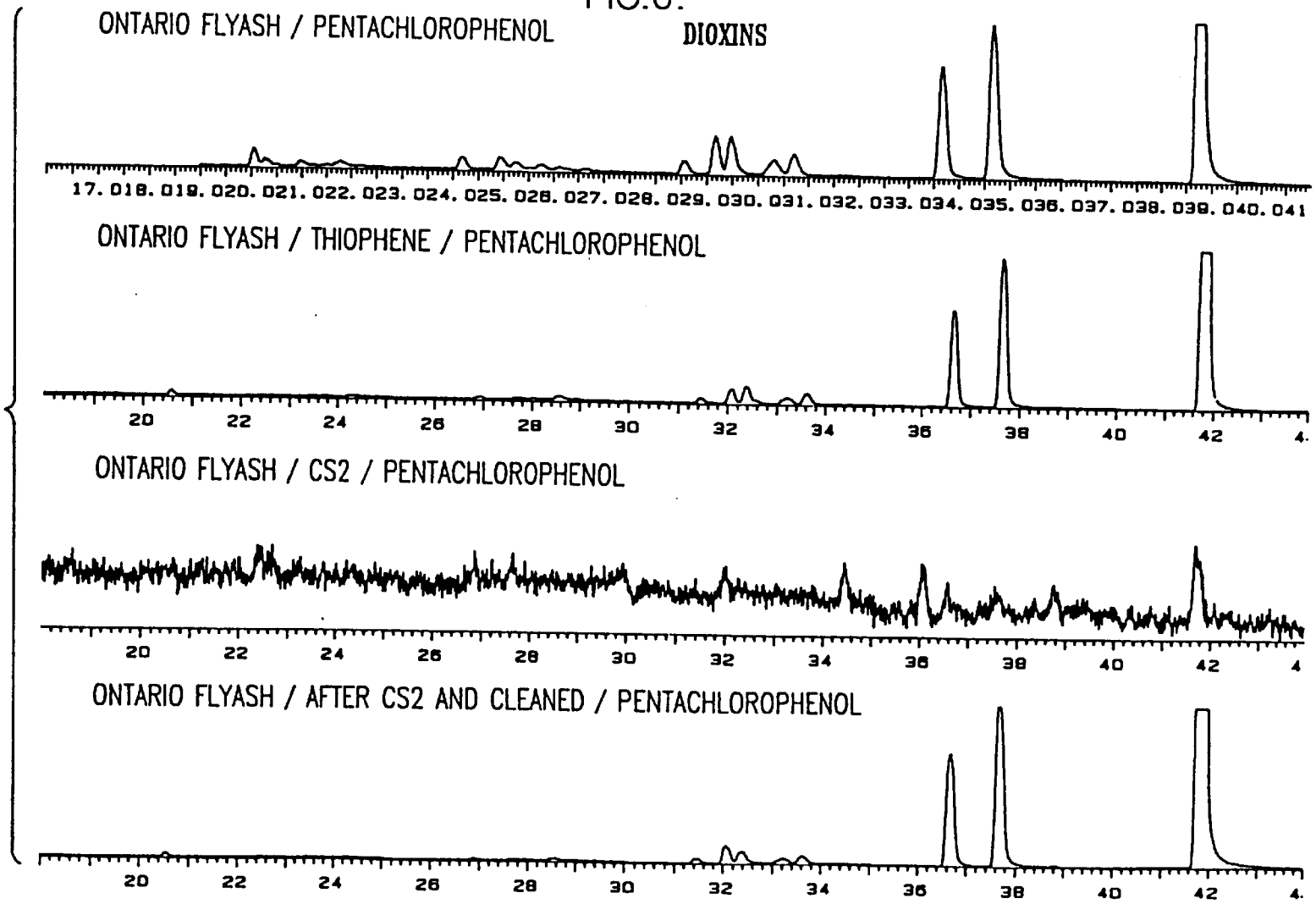

The results obtained appear in FIG. 6. As can be seen, production of tetra- to hexa-chlorodioxins was decreased upon thiophene addition (second trace) and production of all chlorinted dioxins was inhibited almost completely with carbon disulphide (third trace). From the lowermost trace, it can be seen that some catalytic activity was regained but, more significantly some of the activity was permanently inhibited.

Example III

This Example illustrates the formation of dioxins from another potential precursor, namely polyvinylchloride.

Example I was repeated except that the combustion products of PVC were passed over Ontario flyash under the same conditions as for pentachlorophenol. In a first experiment, a solution containing three components identified in the effluent of a PVC pyrolysis experiment was passed through the flyash. In a second experiment, a quantity of PVC was heated in a tube with a flow of air and the combustion products collected in methanol. A portion of this solution was concentrated and passed through the flyash. In both cases, dioxins were detected in the reaction products but were not detected in the starting solutions, showing catalyzed reactions on the flyash. Even though the second solution did not contain chlorinated compounds, yet chlorinated dioxins were formed. (The source of the chlorine may have been inorganic chlorides on the surface of the flyash).

Example IV

This Example shows the effect of temperature on dioxin formation.

The experiment of Example I was repeated using pentachlorophenol and Ontario flyash at different temperatures. The results obtained are shown in the following Table 1:

TABLE 1

| | Dioxin Congeners | | | | |
|---|---|---|---|---|---|
| Temperature | TCDD | P5CDD | H6CDD | H7CDD | OCDD |
| 150° C. | ND[a] | ND | ND | ND | NQ[b] |
| 250° C. | ND | ND | 29[c] | 583 | 3463 |
| 300° C. | 313 | 796 | 1159 | 1073 | 209 |
| 340° C. | 61 | 228 | 392 | 384 | 50 |
| 400° C. | 8 | 17 | 34 | 70 | 14 |

[a]ND = not detected
[b]NQ = amount too small to be quantitated
[c]ng dioxin produced from 100 ug of labelled pentachlorophenol As may be seen therein, dioxins form at temperatures between 250° C. and 400° C. The maximum amounts were detected at 300° C. while very little dioxins were detected at 400° C. and none at 150° C.

Example V

This Example illustrates the formation of dioxin from the combustion products of inked newsprint and PVC in comparison to combustion products of pentachlorophenol (Example I).

45 g samples of PVC and inked newsprint were combusted separately in a quartz tube heated to 900° C. in an air stream and the combustion products collected in an impinger cooled to −10° C. The impinger was rinsed with 200 ml of methanol. The solution was condensed to 10 mL and 100 $\mu$L of this solution was deposited on glass beads. The procedure of Example I then was repeated for these materials. The dioxins formed from these materials were similar to those formed in municipal incinerators on flyash under actual operating conditions.

The amounts of dioxins formed in these experiments were compared to that formed from pentachlorophenol and the results are set forth in Table 2:

TABLE 2

| | Dioxin Congeners | | | | |
|---|---|---|---|---|---|
| Mixture | TCDD | P5CDD | H6CDD | H7CDD | OCDD |
| Pentachlorophenol Combustion Products | 63[a] | 113 | 161 | 116 | 11 |
| PVC Combustion Products | 25[b] | 33 | 30 | 24 | 5 |
| Paper Combustion Products | 122 | 135 | 90 | 23 | NC[c] |

[a]ng dioxin per gram of flyash
[b]ng dioxin produced
[c]ND = not detected

As may be seen from these results, the dioxins produced the paper combustion mixture were predominantly tetrachloro- and pentachlorodioxins. The similarity of the total congener groups formed from these mixtures to those found in incinerators suggests that inked newspapers, which make up as much as forty percent of the refuse, provide a large number and amount of compounds for synthesis to dioxins.

SUMMARY OF DISCLOSURE

In summary of this disclosure, the unexpected discovery of the role of flyash in the formation of polychlorinated dioxins and furans has lead to a novel process of suppression of dioxin formation by poisoning the catalytic effect of the flyash. Modifications are possible within the scope of this invention.

What we claim is:

1. A method of disposal of solid refuse in the form of municipal waste containing materials which are combustible to form precursors for dioxin formation, which comprises incinerating said solid refuse in a self-sustaining incineration operation to form gaseous products of incineration containing fly ash and precursors for dioxin formation, passing said gaseous products of incineration to a precipitation step wherein said fly ash is precipitated from the gaseous products of incineration, contacting the surface of said fly ash during said passage of said gaseous products of incineration to said precipitation step with a small quantity of at least one catalytic-effect inhibiting substance capable of being adsorbed on and reacting with catalytically-active sites on the surface of the fly ash to form stable, inactive surface compounds, so as to inhibit catalytic effects of said fly ash towards the formation of dioxins from said precursors during said passage, and venting said gaseous products of incineration after said precipitation of fly ash therefrom.

2. The method of claim 1 wherein said [catalytic effect poisoning] *inhibition of catalytic effects of said fly ash* is effected by providing [a] *said at least one* catalytic-effect [poisoning material] *inhibiting substance* in association with the flyash.

3. The method of claim 2 wherein said [material] *at least one inhibiting substance* is provided in association with the flyash by including the [material] *at least one inhibiting substance* or a precursor [therefor] *thereof* in the solids refuse incinerated.

4. The method of claim 3 wherein said [material] *at least one inhibiting substance* is included in the solids refuse incinerated by spraying the same onto the solids refuse prior to *said* incineration.

5. The method of claim 4 wherein said [material] *at least one inhibiting substance* is carbon disulfide.

6. The method of claim 3 wherein said [material] *at least one inhibiting substance* is included in the solids refuse incinerated by including the same in a combustion air stream used in said incineration.

7. The method of claim 6 wherein said [material] *at least one inhibiting substance* is sulfur dioxide.

8. The method of claim 3 wherein said [material] *at least one inhibiting substance* is included in the solids refuse incinerated by mixing the [material] *at least one inhibiting substance* with the solids refuse prior to *said* incineration.

9. The method of claim 8 wherein said [material] *at least one inhibiting substance* is powdered high sulfur coal or pitch tar.

10. The method of claim 3 wherein the quantity of said [material] *at least one inhibiting substance* is about 0.01 to about 0.1 wt. % of the solids refuse incinerated.

11. The method of claim 2 wherein said [catalytic effect poisoning] *inhibition of catalytic effects of said fly ash* is effected by introducing [a] *said at least one* catalytic-effect [poisoning material to] *inhibiting substance into* the gaseous products of incineration between *said* incineration and *said* precipitation.

12. The method of claim 11 wherein the gaseous products of incineration have a temperature of about 400° to about 500° C. at the location of introduction of [the poisoning material] *said at least one inhibiting substance*.

13. The method of claim 12 wherein said [material] *at least one inhibiting substance* is carbon disulphide or calcium sulphide.

14. The method of claim 2 wherein said [catalytic effect poisoning] *inhibition of catalytic effects of said fly ash* is effected by incorporating [a] *said at least one* catalytic-effect [poisoning material] *inhibiting substance* into material subsequently to be incinerated.

15. The method of claim 14 wherein said material to be incinerated is newsprint and said *at least one* catalytic-effect [poisoning material] *inhibiting substance* is impregnated into the newsprint.

* * * * *